United States Patent
Vinogradov

(10) Patent No.: US 8,201,743 B2
(45) Date of Patent: Jun. 19, 2012

(54) BAR CODE READER WITH IMPROVED LENS FOR IMAGING WITH BALANCED ASTIGMATISM

(75) Inventor: Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 795 days.

(21) Appl. No.: 11/769,798

(22) Filed: Jun. 28, 2007

(65) Prior Publication Data

US 2009/0001169 A1   Jan. 1, 2009

(51) Int. Cl.
*G06K 7/10* (2006.01)
*G06K 15/12* (2006.01)

(52) U.S. Cl. .............................. 235/462.41; 235/454

(58) Field of Classification Search ............ 235/472.01, 235/462.11, 462.21, 462.22, 462.35, 455, 235/462.01, 454, 462.41; 359/784, 569

See application file for complete search history.

(56) References Cited

U.S. PATENT DOCUMENTS

| | | | | |
|---|---|---|---|---|
| 5,187,353 A * | 2/1993 | Metlitsky et al. | ........ | 235/462.35 |
| 5,654,533 A * | 8/1997 | Suzuki et al. | ................. | 235/455 |
| 5,796,088 A * | 8/1998 | Wall | ......................... | 235/472.01 |
| 5,814,803 A * | 9/1998 | Olmstead et al. | ........ | 235/462.01 |
| 6,651,888 B1 * | 11/2003 | Gurevich et al. | ........ | 235/462.21 |
| 6,866,198 B2 * | 3/2005 | Patel et al. | ............... | 235/472.01 |
| 2007/0058256 A1 * | 3/2007 | Sun | .............................. | 359/569 |
| 2007/0070526 A1 * | 3/2007 | Sato | .............................. | 359/784 |
| 2008/0023548 A1 * | 1/2008 | Tsi-Shi et al. | ........... | 235/462.22 |
| 2008/0223934 A1 * | 9/2008 | Havens et al. | ........... | 235/462.42 |

* cited by examiner

*Primary Examiner* — Thien T Mai
(74) *Attorney, Agent, or Firm* — Nong-Qiang Fan

(57) ABSTRACT

An exemplary imaging based barcode reader has an imaging system that includes a photosensitive array, a focusing lens fixed with respect to the light detecting array which creates an image of a target object on the light detecting array; and an aperture stop fixed in relation to the focusing lens having an opening that allows light from the target object to impinge upon the lens for focusing onto the light detecting array. The focusing lens has a surface facing the aperture stop that is toroidal and in one exemplary embodiment approximates a cylinder that balances or optimizes. Astigmatism of the lens in the imaging plane located in the close proximity to the photosensitive array.

23 Claims, 4 Drawing Sheets

BAR CODE READER WITH IMPROVED LENS FOR IMAGING WITH BALANCED ASTIGMATISM

FIELD OF THE INVENTION

The present invention relates to an imaging-based bar code reader.

BACKGROUND OF THE INVENTION

Various electro-optical systems have been developed for reading optical indicia, such as bar codes. A bar code is a coded pattern of graphical indicia comprised of a matrix or series of bars and spaces of varying widths, the bars and spaces having differing light reflecting characteristics. Systems that read and decode bar codes employing CCD or CMOS-based imaging systems are typically referred to as imaging-based bar code readers or bar code scanners.

Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging system processes the digitized signals and then attempts to decode the imaged bar code.

Usually an imaging lens for a camera consist of a few lens elements. Simple cost effective designs are very challenging and difficult to achieve with an adequate performance. The simplest well known camera design is a pinhole camera. No lens is required in this design. The main problem with the pinhole design is a low light throughput and a limited resolution. The low light throughput can be compensated by improving the illumination system, but this may significantly increase the cost of the imaging optics. It would be beneficial to increase the aperture size for a better light throughput. The resolution is limited due to the diffraction of light at the aperture and cannot be further improved. Manufacturing of an accurate pinhole aperture in mass production could also be very challenging and costly.

A single lens design gives more flexibility for the design but finding the right arrangement of the lens and an aperture stop is challenging. In general a single lens design yields poor off axis performance if proper arrangement has not been implemented. Astigmatism in the resulting image is one concern.

Astigmatism is a lens aberration that results in a cone of light from an object point not being converged to a point image at any place behind the lens. Rather, the cone is converged in one direction (for example, horizontal\) at a certain location and in the other direction (for example, vertical) at a different location.

This phenomenon can be caused by asymmetry in the lens. However, even in a perfectly symmetrical lens, the phenomenon will still occur for object points not on the optical axis of the lens.

SUMMARY

In the present invention it is proposed a single lens element design with an aperture and cylindrical surface, which balances performance over the entire field, improves field curvature, and allows a bigger aperture stop for a higher light throughput.

An exemplary imaging based barcode reader has an imaging system that includes a light detecting array, a focusing lens fixed with respect to the light detecting array which creates an image of a target object on the light detecting array; and an aperture stop fixed in relation to the focusing lens having an opening that allows light from the target object to impinge upon the lens for focusing onto the light detecting array.

The focusing lens has a surface facing the aperture stop that is toroidal and in one exemplary embodiment approximates a cylinder that balances or optimizes for astigmatism in images formed on the pixel array.

These and other objects, advantages and features of the exemplary barcode reader are understood from the following detailed description which is described in conjunction with the accompanying drawings.

DETAILED DESCRIPTION

Figure 1:
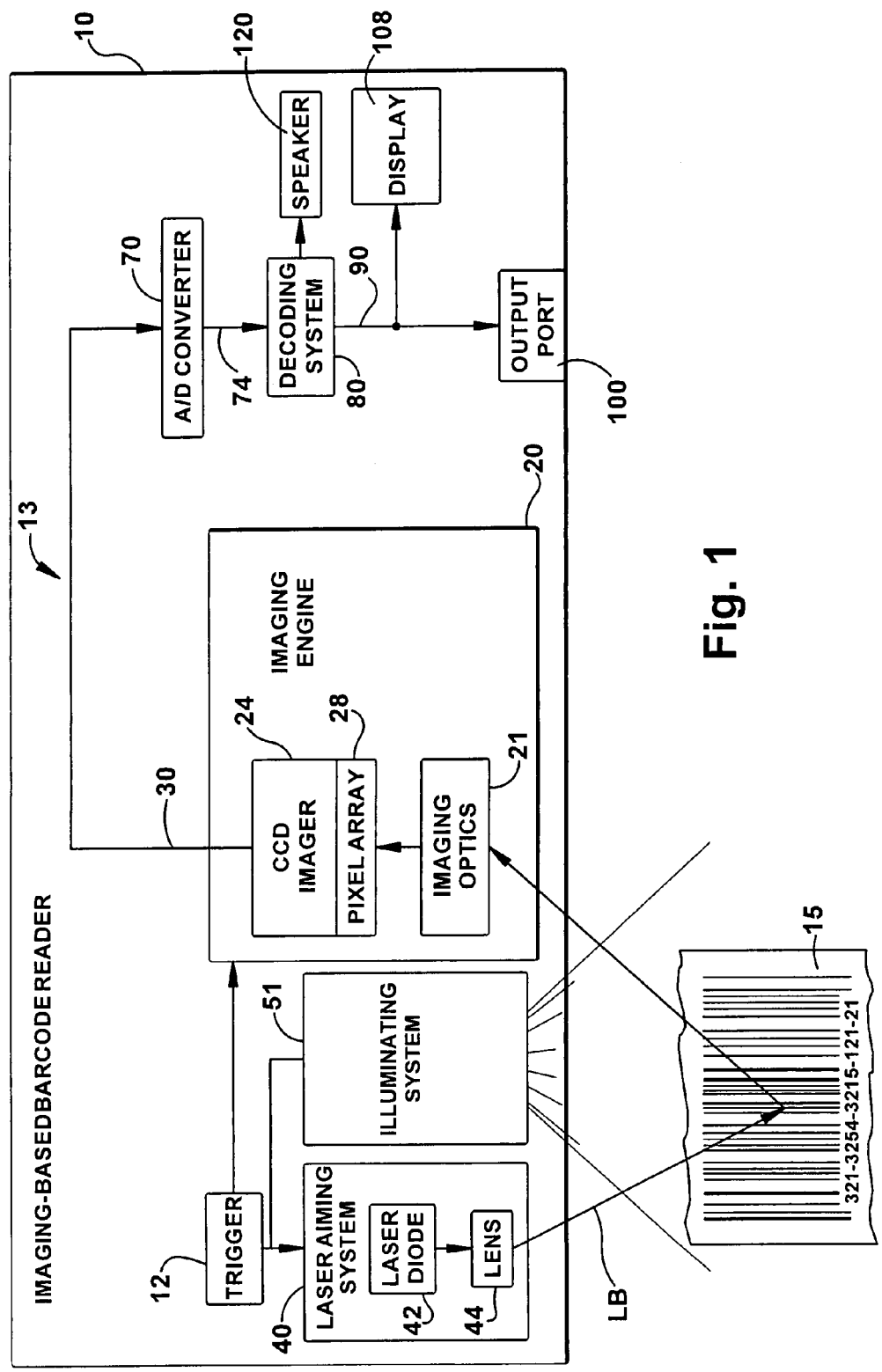
FIG. 1 is a schematic block diagram of an imaging-based bar code reader of the present invention.

A block diagram of an imaging-based bar code reader 10 is shown schematically in FIG. 1. The bar code reader 10 decodes 1D and 2D bar codes and postal codes, and can also capture images and signatures. In one preferred embodiment of the present invention, the bar code reader 10 is a hand held portable reader components of which are supported within a housing. The depicted scanner is for reading barcodes in close proximity to a housing exit window, and could for example be built into household appliances such as coffeemaker or the like.

The bar code reader of the present invention, however, may be advantageously used in connection with any type of imaging-based automatic identification system including, but not limited to, bar code readers, signature imaging acquisition and identification systems, optical character recognition systems, fingerprint identification systems and the like. It is the intent of the present invention to encompass all such imaging-based identification systems.

The bar code reader 10 includes a trigger 12 coupled to bar code reader circuitry 13 for initiating reading of a target bar code 150 positioned on an object when the trigger 12 is pulled or pressed. The bar code reader 10 includes an imaging component 20 including imaging optics 21 and a CCD imager 24.

A fixed lens (described in greater detail below) focuses light reflected from the target bar code 150 onto a light monitoring array 28 of photosensors or pixels of the CCD imager 24. The pixels of pixel array 28 are read out generating an analog signal at an output 30 representative of an image of whatever is focused by the lens on the pixel array 28, for example, an image of the bar code 150. The analog image signal at the output 30 is then digitized by an analog-to-digital converter 70 and a digitized signal at an output 74 is decoded by decoder circuitry 80. Decoded data 90, representative of the data/information coded in the bar code 15 is then output via a data output port 100 and/or displayed to a user of the reader 10 via a display 108. Upon achieving a good "read" of the bar code 15, that is, the bar code 15 was successfully imaged and decoded, a speaker 120 is activated by the circuitry 13 to indicate to the user that the bar code has been successfully read. In one illustrative example, after successful decode of a coffee disc, a coffeemaker automatically selects mode of operation to brew coffee accordingly prescribed by the barcode.

Imaging Optics

Figure 2:
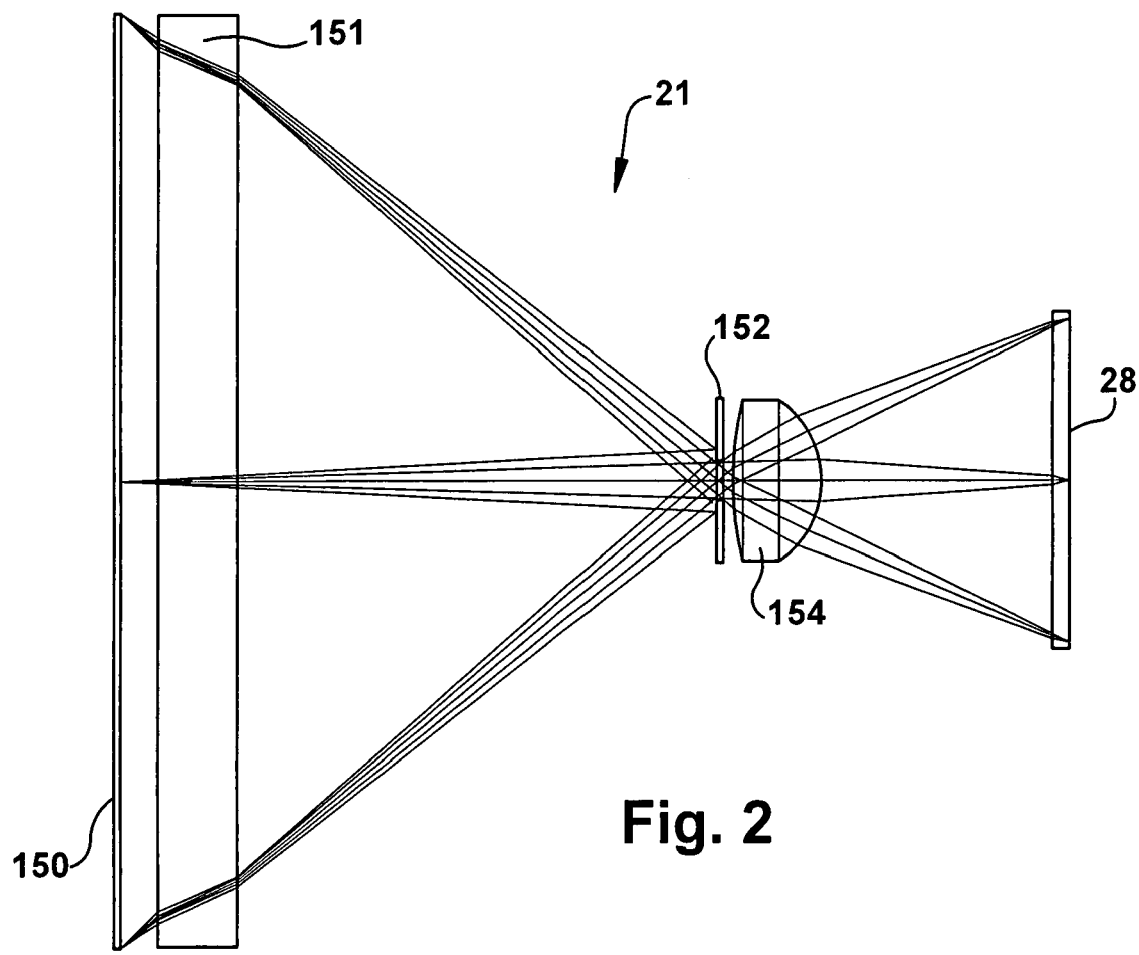
FIG. 2 is a top plan view of imaging optics of a bar code reader of the present invention.
Figure 3:
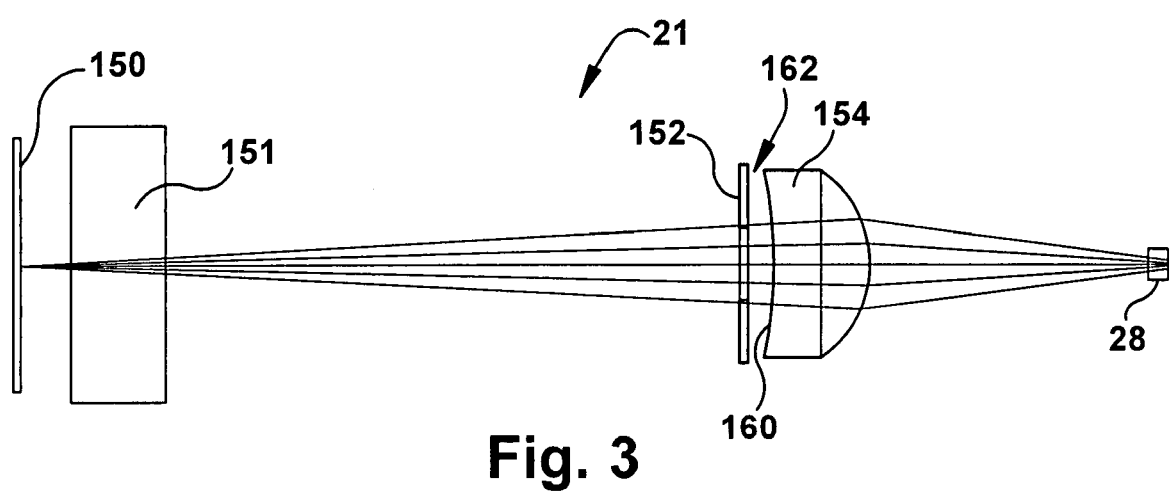
FIG. 3 is a side elevation view of imaging optics of a bar code reader of the present invention.
Figure 4:
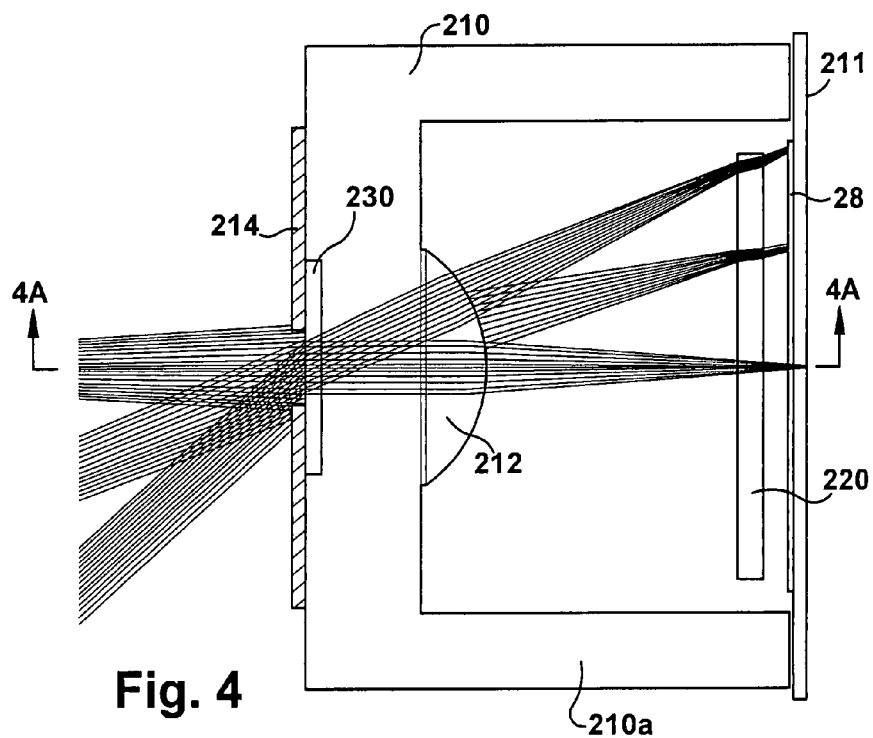
FIG. 4 is a top view of an alternate embodiment of imaging optics for use with the invention.
Figure 4A:
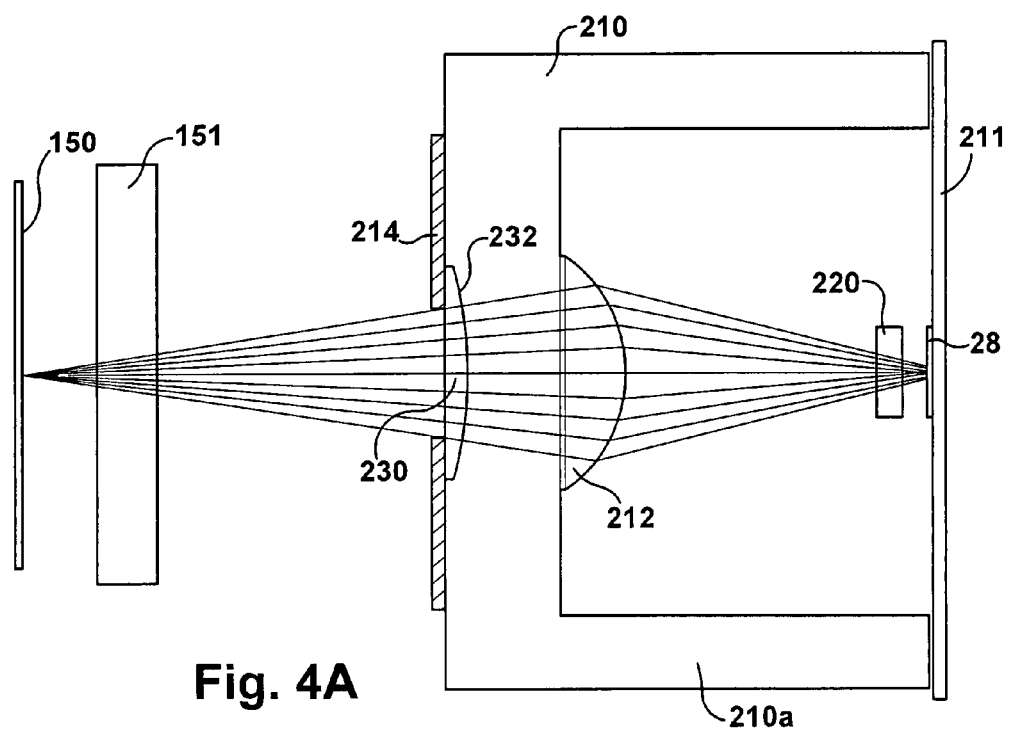
FIG. 4A is a side elevation view of the imaging optics of FIG. 4.

FIGS. 2 and 3 schematically depict imaging optics 21 which projects an image of the barcode 150 onto an active area of the light monitoring array 28. Light from the barcode passes through an entrance window 151 and then through an aperture stop 152 and a fixed lens 154 A first surface 160 of the lens 154 facing the aperture stop 152 is a section of a cylinder and balances astigmatism across the field of view (along the sensor array). The cylindrical surface facing the aperture stop is concave (FIG. 3) or convex (FIG. 4). More generally, the surface 160 can be a torus or surface or a toroid. The shape of a toroid is generated by revolving a circle around an axis external to the circle.

Figure 5:
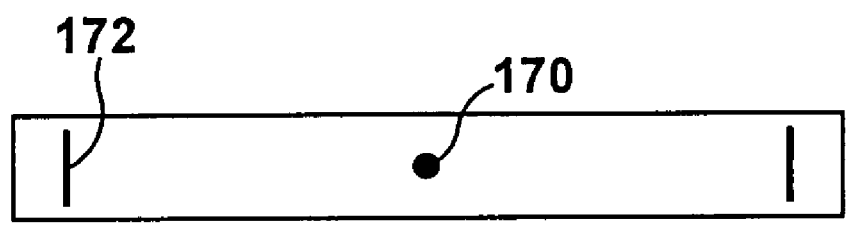
FIGS. 5 and 6 illustrate imaging effects of balanced (or optimized) astigmatism on axis and off axis spots with and without use of the invention.

In a preferred embodiment there is an air gap 162 between the aperture and the cylindrical surface. A preferred radius of curvature of the cylindrical surface is from 5-25 MM and more preferably about 12 MM and the distance between the aperture and the lens is from 0 to 2 MM and more preferably about 1 MM. Typically in a rotationally symmetrical imaging system astigmatism is zero on axis and could be quite large off axis, at the edge of the field of view. If one images a small point, its image on the sensor surface on axis will appear as a small round dot 170 (FIG. 5), however, if the point is located significantly off axis, at the edge of the field of view, the image will look like an line 172 as show in the FIG. 5, the spot will be elongated in vertical direction.

Figure 6:
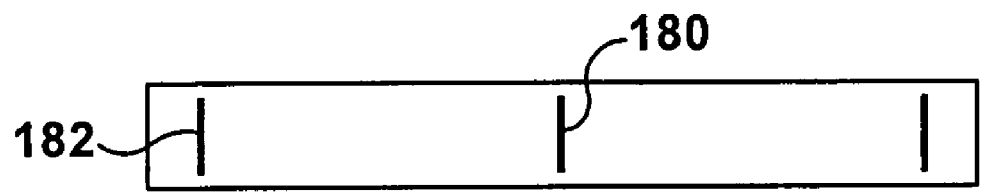

On axis barcodes with defects such as scratches and voids on the surface of the barcode 150 are difficult to read. If a projected image of a defect is the size of the sensor pixel, it might be incorrectly interpreted by the decoder as an actual bar or space. It will be beneficial to have vertically elongated spot uniformly over the entire sensor. The cylindrical surface integrated into the lens between the aperture stop and aspherical surface produces a vertically elongated spot over the entire linear sensor as shown in the FIG. 6.

This effect can be described in terms of sagital and tangential astigmatisms. In case of no cylindrical surface the difference between sagital and tangential astigmatism is zero on axis, which results in a round spot, however off axis there is a difference between the sagital and tangential astigmatisms, which result in elongated spot.

The origin and meaning of the terms sagital and tangential astigmatisms are found in a book entitled Modern Optical Engineering by Warren J. Smith Second Edition, McGraw Hill Copyright 1990 at pages 65-67 which is incorporated herein by reference. With a cylindrical surface entrance surface to the lens, the difference between sagital and tangential astigmatism is relatively constant, which results in a substantially consistent elongated spot on the sensor 28.

A second surface of the lens faces the sensor and has a rotationally symmetrical spherical or aspherical surface. In a preferred embodiment the surface is aspherical. An aspheric lens in this context is a lens whose surface that faces the array 28 is neither a portion of a sphere nor of a circular cylinder. An aspherical surface allows better compensation for aberrations, less field curvature and yields better lens performance. Usually aspherical lenses can be well compensated for spherical aberration therefore the diameter of the aperture stop 152 can be large. A large aperture transmits more light onto the sensor array therefore the signal to noise ratio is improved. In this case less light is necessary from the illumination system, which can reduce cost of the scanner. Typically the aperture size is about 1 MM width and 2 MM height to compare with pinhole aperture width 0.1 MM.

The aperture can be round or elongated along the vertical direction, i.e. elliptical or rectangular. It gives additional light throughput through the imaging lens. In a preferred embodiment the aperture can be elliptical.

The lens 212 shown in FIG. 4 is integral with a support 210. A concave forward facing lens surface 232 is spaced from an aperture stop 214 by a gap 230. The lens 212 and support 210 are molded in one piece from clear plastic such as acrylic or polycarbonate. The support has a generally annular portion 210a which supports a printed circuit board 211 which in turn supports the sensor array 28. In the illustrated embodiment, a transparent glass cover 220 protects the array 28 although this is an optional feature of the system. This mounting arrangement allows better positioning accuracy of the imaging lens with respect to the sensor 28. In this type of optics assembly no active focusing is required, which further reduces the manufacturing cost.

It is known that focal distance of the plastic lens varies significantly with temperature. At higher temperatures the focal distance of the lens increases. In some cases it may compromise adequate product performance. In the proposed design, due to the thermal expansion of the annular portion 210a, the distance from the lens 212 to the sensor 28 increases/decreases with temperature, which partially compensates the thermal variation of the focal length of the lens. (if the temperature increases the lens expands, if the temperature decreases, the lens contracts.) The lens surface moves further away from the sensor 28 when the temperature rises and by this means partially compensate increased in the focal distance of the lens.

The lens may have mechanical features, such as pins or keys, to align accurately an aperture 214 attached to the support 210 with respect to the lens surface to make it easier to consistently make the product. In the FIG. 4 embodiment, the lens is injection molded out of a plastic material. This embodiment has cost advantages in fabricating. No additional cost is required in mass producing this embodiment in quantity if an aspherical design is used but performance is improved over a spherical surface. A surface adjacent to the aperture 214 may have a cylindrical or toroidal curvature as well, which can give an additional design flexibility to project the best possible image to the sensor.

While the present invention has been described with a degree of particularity, it is the intent that the invention includes all modifications and alterations from the disclosed design falling with the spirit or scope of the appended claims.

The invention claimed is:

1. An imaging based barcode reader for imaging an object of interest comprising:
   an imaging system that includes a light sensitive pixel array,
   a focusing single-lens fixed with respect to the pixel array to transmit an image of a target object to the light sensitive array;
   an aperture stop fixed in relation to the focusing single-lens having an opening that allows light from the object of interest to impinge upon the lens for focusing onto the pixel array;
   said focusing single-lens having a toroidal entrance surface and a second rotationally symmetric exit surface, wherein the toroidal entrance surface faces the aperture stop for balancing astigmatism in images formed on the light sensitive array, wherein the toroidal entrance surface has a non-rotationally symmetric surface along an optical axis of the focusing single-lens; and wherein the second rotationally symmetric exit surface faces the light sensitive array.

2. The barcode reader of claim 1 wherein the toroidal entrance surface forms a section of a cylinder.

3. The barcode reader of claim 2 wherein a radius of curvature of the cylinder is between five and twenty five millimeters.

4. The barcode reader of claim 1 wherein the distance from the aperture stop to the entrance surface of the focusing single-lens is from zero to two millimeters.

5. The bar code reader of claim 1 wherein the aperture stop provides an elliptical opening for allowing light from the object of interest to pass through the lens.

6. The bar code reader of claim 1 additionally comprising a support integral with the lens which spaces the lens from the light sensitive array.

7. The bar code reader of claim 6 wherein the support is constructed of plastic.

8. The bar code reader of claim 7 wherein the plastic is an acrylic (PMMA) or polycarbonate.

9. The bar code reader of claim 6 wherein the support also mounts the aperture stop with respect to the lens.

10. The barcode reader of claim 1 wherein the focusing single-lens has a second surface facing the light sensitive array that is aspherical.

11. A method of target object identification comprising:
positioning an imaging single-lens having a toroidal entrance surface between a target object and an imaging array, wherein the toroidal entrance surface has a non-rotationally symmetric surface along an optical axis of the imaging single-lens, and wherein the imaging single-lens has a second exit surface facing the imaging array, the second exit surface being rotationally symmetric;
causing light from the target object to pass through an aperture stop and impinge upon the entrance surface of the imaging single-lens; and
interpreting a light pattern falling on the imaging array as information conveying indicia.

12. The method of claim 11 additionally comprising providing a support to space the single-lens a distance from the imaging array.

13. The method of claim 11 wherein the lens is constructed integral to a plastic support, wherein the plastic support compensates for expansion and contraction of the single-lens with temperature by changing the spacing between the imaging array and single-lens.

14. The method of claim 13 wherein the aperture stop is supported by the plastic support.

15. The method of claim 11 wherein the aperture stop defines an elliptical opening for letting light impinge on the single-lens.

16. An imaging based barcode reader for imaging a barcode of interest comprising:
imaging means for detecting light impinging onto a photosensitive array,
focusing means, fixed with respect to the photosensitive array for transmitting an image of a target object to the photosensitive array; and
aperture means fixed in relation to the focusing means defining an opening that allows light from the object of interest to impinge upon the lens for focusing onto the photosensitive array;
said focusing means including a toroidal entrance surface facing the aperture stop for balancing astigmatism in the imaging plane located in the close proximity to the photosensitive array, wherein the toroidal entrance surface has a non-rotationally symmetric surface along an optical axis of the focusing means; and
wherein said focusing means has a second exit surface facing the light sensitive array, the second surface being rotationally symmetric.

17. The barcode reader of claim 16 wherein the toroidal entrance surface of the focusing means forms a section of a cylinder.

18. The bar code reader of claim 16 wherein the aperture means comprises an elliptical opening for allowing light from the object of interest to pass through the focusing means.

19. The bar code reader of claim 16 additionally comprising a support integral with the lens which spaces the lens from the light sensitive array.

20. The bar code reader of claim 19 wherein the support is constructed of plastic.

21. The bar code reader of claim 20 wherein the plastic is an acrylic or polycarbonate.

22. The bar code reader of claim 19 wherein the support also mounts the aperture means with respect to the focusing means.

23. The barcode reader of claim 1 wherein the second rotationally symmetric exit surface is a spherical surface.

* * * * *

UNITED STATES PATENT AND TRADEMARK OFFICE
CERTIFICATE OF CORRECTION

| | | |
|---|---|---|
| PATENT NO. | : 8,201,743 B2 | Page 1 of 1 |
| APPLICATION NO. | : 11/769798 | |
| DATED | : June 19, 2012 | |
| INVENTOR(S) | : Vinogradov | |

It is certified that error appears in the above-identified patent and that said Letters Patent is hereby corrected as shown below:

In Fig. 1, Drawing Sheet 1 of 4, for the Headline, Line 1, delete "IMAGING-BASEDBARCODE READER" and insert -- IMAGING-BASED BARCODE READER --, therefor.

In Column 1, Line 51, delete "horizontal\)" and insert -- horizontal) --, therefor.

In Column 3, Line 15, delete "lens 154" and insert -- lens 154. --, therefor.

In Column 5, Line 12, in Claim 4, delete "the" and insert -- a --, therefor.

Signed and Sealed this
Twenty-ninth Day of January, 2013

David J. Kappos
*Director of the United States Patent and Trademark Office*